United States Patent Office 3,460,950
Patented Aug. 12, 1969

3,460,950
METHOD FOR THE DEODORIZATION OF BEAN MILKS
Koji Fujita, Tokyo, Eisuke Sato, Nagoya-shi, and Tatsuo Moroe, Musashino-shi, Tokyo, Japan, assignors to Takasago Perfumery Company Limited, Tokyo, Japan
No Drawing. Filed Apr. 13, 1966, Ser. No. 542,239
Claims priority, application Japan, Oct. 25, 1965, 40/65,220
Int. Cl. A23c 11/00
U.S. Cl. 99—64          6 Claims

ABSTRACT OF THE DISCLOSURE

A method of deodorizing soybean milk and/or peanut milk comprising the steps of incubating soybean milk and/or peanut milk with conidiospores of an Aspergillus selected from the group consisting of Aspergillus oryzae, Aspergillus niger, Aspergillus glaucus, Aspergillus ochraceus and Aspergillus versicolor at 25–45° C. for about 2 hours with gentle agitation and then heating to kill the conidiospores.

---

The present invention relates to the elimination of specific flavors and odors of soybeans and peanuts with enzymatic and/or microbiological actions.

More particularly, the present invention relates to the treatment of soybean milk and peanut milk with the conidiospores of filamentous fungi belonging to the genus Aspergillus for the purpose of removing the disagreeable flavors and odors.

Although soybeans and peanuts have been recognized to contain large amounts of proteins superior in nutrition, they have not been utilized as extensively as meats or other food products. This is due in large part to the fact that they have by nature characteristic, disagreeable "green" flavors that cause one's appetite to decrease.

A number of reports and patents have been issued concerning the processes of improving the flavors and odors of soybeans, but none is satisfactory because either incompleteness of the deodorization effects, or of industrial inapplicabilities. For example, even when the disagreeable flavors are once removed by a certain reported process, the same is regenerated upon heating.

Among such deodorizing processes is a process of deodorization of soybean milk by the koji of Aspergillus oryzae and the strains belonging to the genus Aspergillus. Although this method is simple in operation, better in deodorizing effect and thus readily applicable to the commercial scale production of odorless bean milks, it has some disadvantages. That is, the koji starter contained, as usual, various kinds of enzymes that could attack the constituents of the bean milk and cause undesirable changes during the deodorizing process. For example, the proteases attacked the bean proteins and hydrolyzed them to produce some polypeptides of bitter taste, and the amylases degraded the starches and other glucides to form the reducing sugars which, in the presence of amino compounds such as proteins, polypeptides or amino acids, readily gave rise to brown discoloration. The oxidative degradations of liquids and other labile materials by lipoxidased or other oxidizing enzymes resulted in the development of rancid flavors.

It is one object of the present invention to provide a process for eliminating the disagreeable flavors and odors of beans without any undesirable change in quality, and to extend the usage of beans as acceptable, nutritious protein-rich food products.

In accordance with this object of the present invention, we have now discovered that the conidiospores separated from the koji starters were more effective in deodorization of bean milk while the enzymatic activities were very low compared with those of the koji. Therefore when the conidiospores were employed instead of the koji, in the deodorization of bean milk, characteristic disagreeable flavors and odors were removed more effectively, without development of bitter taste, brown discoloration, and rancid flavors, etc.

The conidiospores which were found effective in deodorization of bean milks were those of Aspergillus oryzae, Aspergillus niger, Aspergillus glaucus, Aspergillus ochraceus and Aspergillus versicolor.

Typical data on Aspergillus oryzae are summarized in the table.

As shown in the table, in the conidiospores, proteases activities were almost nonexistent and amylase activities were about 1/10 or less as compared with those of the parent mycelia (koji starters whose conidiospores were removed as completely as possible), though the deodorizing effects were superior to koji starters.

From these results it is concluded that the conidiospores of the above mentioned aspergilli were most effective in deodorization of bean milk without any undesirable change in quality.

The processes of preparation of conidiospores are as follows: The conidiospores of the above-mentioned aspergilli were respectively transferred from potato-dextrose agar slants to 500 ml. Fernbach flasks containing 50 g. of solid media of the following compositions: wheat bran 37.5%, defatted soybean flakes 12.5%, and water 50%.

The respectively inoculated flasks were incubated at 28° C. for 72 hours with occasional shaking to prevent clumps. The cultures were dried, filtered with 100 mesh sieve, and the conidiospores were collected.

In the cases of large scale preparations, specially designed trays or boxes were employed instead of Fernbach flasks.

The process of preparation of soybean milk is as follow: 1 kg. of soybeans or defatted soybeans were macerated, ground with addition of water and, heated to 85° C. to inactivate soybean enzymes and to enhance the solubility of soybean constituents. The product was then filtered. The final volume of the filtrate was adjusted to 5 liters.

The solid content of this soybean milk was 12–15%. 500 mg. of any of the above-mentioned conidiospores, was added to this soybean milk, singly or in the mixed state, which were previously suspended in water containing a small amount of surface active agents.

The inoculated milk was incubated at 45° C. for about 2 hours, then heated to kill the conidiospores and homogenized. The odorless milk thus obtained may be dried and pulverized if necessary.

The detailed procedures are illustrated in the following examples.

*Example 1.*—1 kg. of soybeans was soaked in water until the beans contained about 1.5 kg. of water (usually for 12–16 hours) and drained and the macerated beans were ground with the addition of 4 kg. water. The slurry thus obtained was heated to 85° C. for 15 minutes, filtered with a cotton filter, cooled, pH adjusted to about 6.0 and inoculated with 500 mg. of the conidiospores of Aspergillus oryzae. The inoculated soybean milk was incubated at 45° C. for 2 hours with gentle agitation, and then heated to 85° C. to kill the conidiospores, and, was homogenized. By this procedure, 5 liters of odorless soybean milk were obtained.

*Example 2.*—1 kg. of defatted soybean powders was dissolved in warm water, heated to 85° C. for 5 minutes, cooled to 37° C., and inoculated with 250 mg. of the conidiospores of Aspergillus oryzae and 250 mg. of the conidiospores of *Aspergillus niger* and maintained at this temperature for 2 hours with gentle agitation.

After the incubation, the milk was heated to 85° C. to kill the conidiospores, and was homogenized and then spray-dried. The yield of the defatted soybean milk powder free from disagreeable flavors and odors was about 900 g.

*Example 3.*—1 kg. of shell-free dried peanuts was treated in the same manner as Example 1, and inoculated with 1 g. of the mixture (1:1 by weight) of the conidiospores of *Aspergillus oryzae* and *Aspergillus glaucus*, and incubated as the same way as Example 1. About 5 liters of odorless peanut milk were obtained. This may be dried, with addition of the proper amount of antioxidant, by means of a spray-dryer or other drying equipments. This deodorizing process of the present invention, as described, is much simpler in operation, economically advantageous as compared with the physicochemical processes developed up to the present time, and much shorter in processing time as compared with the enzymatic or microbiological processes reported to date, and therefore free from putrefaction or coagulation of bean milk.

Moreover, since this process requires no drastic heat treatment such as sterilization or steam deodorizing processes, there is less opportunity for protein denaturation.

The mechanism of the deodorization of bean milk by the conidiospores is not known yet; the time required for deodorization by the conidiospores is shorter than the time required for germination of the conidiospores, and swelling or emergence of germ tubes could not be observed during the deodorizing process.

Nevertheless, it is believed that deodorization may be correlated closely with the germination of the conidiospores, that is, odoriferous substances of bean milks may be incorporated into the conidiospores at the preliminary stage of spore germination rather than degraded by the enzymes of conidiospores. In this respect, future work would be expected to solve the problems, but from the practical point of view, the deodorizing process of the present invention is simple in operation, complete in its effect and easily applicable to the industrial scale production of odorless soybean milk and peanut milk as well as of other agricultural products such as barley, wheat, etc. which are free from disagreeable flavors and odors.

TABLE

Enzymatic activities and the deodorizing effects of the koji starter, the mycelium (the koji starter whose conidiospores are separated as completely as possible), and the conidiospores separated from the koji starter, of *Aspergillus oryzae*.

| | Protease activity (u./g.) [2] | Amylase activity (u./g.) [3] | Lipase activity (u./g.) [4] | Phosphatase activity (u./g.) | Deodorizing effect |
|---|---|---|---|---|---|
| Koji or culture on solid medium [1] | 5,350 | 127,800 | 92.7 | a,[5] 1,019 b,[6] 0 c,[7] 54,000 | ++ |
| Mycelium [1] | 7,250 | 156,000 | 103.4 | a, 294 b, 0 c, 2,620 | + |
| Conidiospores | 0 | 9,960 | 84.6 | a, 956 b, 99 c, 34,260 | +++ |

[1] Containing culture medium.
[2] Assayed with the modified Anson method (Ref. B. Hagiwara; Ann. Rep. Fac. Sci. Osaka Univ. 2, 35–79 (1954)).
[3] Assayed with the 3.5-dinitrosalicylic acid method (Ref. E. Borel et al.; Helv. Chim. Acta 35, 115 (1952)).
[4] Assayed with the modified Nord method (Ref. K. Yamada, H. Machida; Nippon Nogei Kagaku Kaisha 36, 860–864 (1962)).
[5] Phosphomonoesterase (6) Phosphodiesterase (Ref. Omori; Enzymol. *4*, 217 (1937)).
[6] None.
[7] Pyrophosphatase (ref. S. Akamatsu; J. Biochem. 39 203 (1952)).

While we have disclosed the above examples, it is to be understood that the same is illustrative only and not intended to limit the scope of the present invention.

We claim:
1. A method of deodorizing soybean milk and/or peanut milk comprising the steps of heating soybean or peanut milk to inactivate the bean or nut enzymes,
   incubating the heated soybean milk or peanut milk with conidiospores of an Aspergillus selected from the group consisting of *Aspergillus oryzae, Aspergillus niger, Aspergillus glaucus, Aspergillus ochraceus* and *Aspergillus versicolor* at 25–45° C. for about 2 hours with gentle agitation, and
   heating to kill the conidiospores.
2. The method, as set forth in claim 1, wherein the conidiospores are those of *Aspergillus niger*.
3. The method, as set forth in claim 1, wherein the conidiospores are those of *Aspergillus glaucus*.
4. The method, as set forth in claim 1, wherein the conidiospores are those of *Aspergillus ochraceus*.
5. The method, as set forth in claim 1, wherein the conidiospores are those of *Aspergillus versicolor*.
6. The method, as set forth in claim 1, wherein the conidiospores are those of *Aspergillus oryzae*.

References Cited

Developments in Industrial Microbiology, vol. 2, "Miso Fermentation," Shibasaki et al., pp. 205–214, Aug. 28, 1961.

ALVIN E. TANENHOLTZ, Primary Examiner

R. B. ANDEWELT, Assistant Examiner

U.S. Cl. X.R.

99—126; 195—2, 65, 81, 103